Oct. 30, 1934. T. SCHWEDENBERG ET AL 1,979,082
ELECTRIC HEATER
Filed March 31, 1933
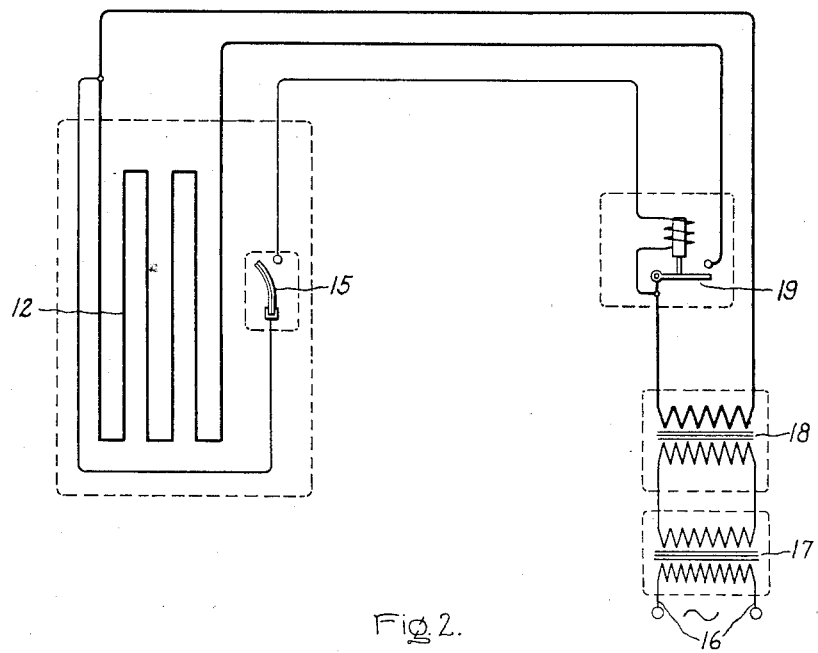
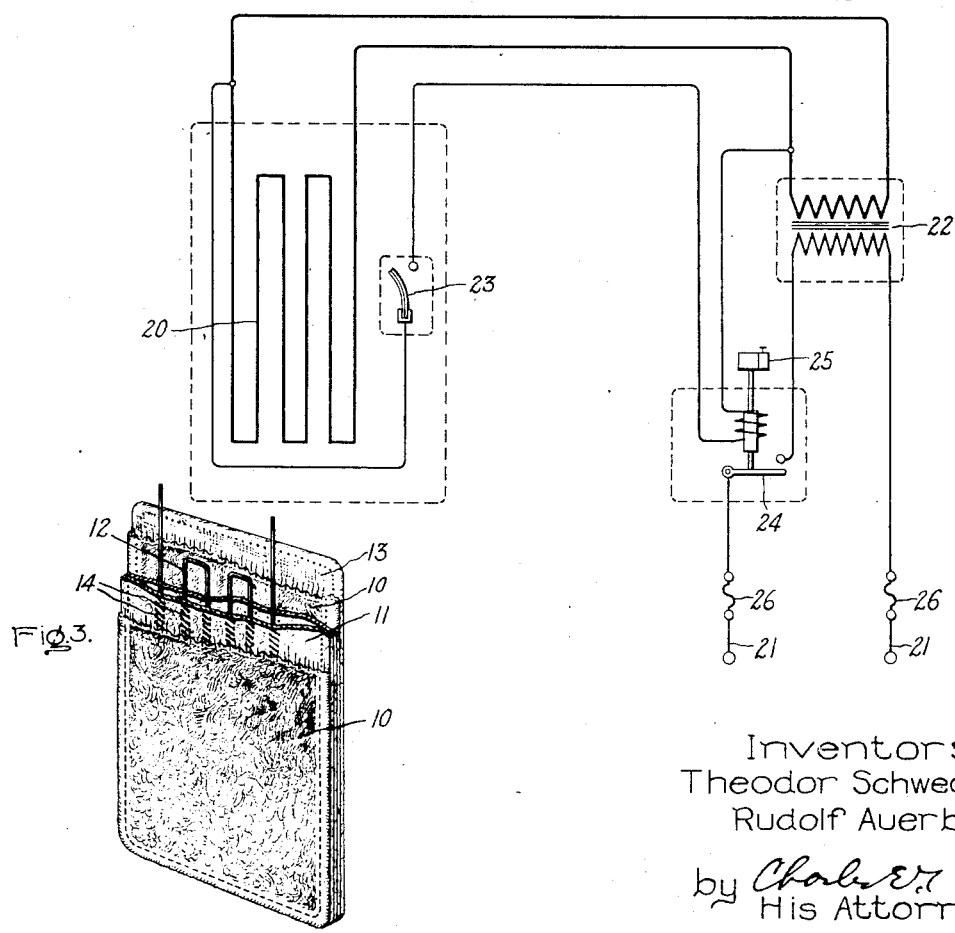
Inventors:
Theodor Schwedenberg,
Rudolf Auerbach,
by Charles E. Tullar
His Attorney.

Patented Oct. 30, 1934

1,979,082

UNITED STATES PATENT OFFICE 1,979,082

ELECTRIC HEATER

Theodor Schwedenberg, Berlin, and Rudolf Auerbach, Neuenhagen, Germany, assignors to General Electric Company, a corporation of New York Application March 31, 1933, Serial No. 663,772
In Germany April 21, 1932

5 Claims. (Cl. 219—46)

This invention relates to electric heaters, more particularly to electrically heated compresses or heating pads, and has for its object the provision of an improved device of this character.

Certain electrically heated compresses or pads heretofore known were provided with a moisture absorbent body or covering separated from an electrical resistance heating element by a layer of electrically insulating material. Compresses of this type possess the disadvantage that the patient or attendant is subject to the danger of rather severe shocks both because of the comparatively high voltages employed for the heating element and because of the likelihood of failure of the insulating layer. Another disadvantage of this arrangement is that the insulating layer retards the transfer of heat from the resistance heating element to the compress, often-times to such an extent that it is actually necessary to saturate the compress with hot water in order to obtain the desired operating temperature.

In accordance with this invention, an electrically heated compress which is efficient and safe to operate is obtained by embedding the resistance heating element in a moisture absorbent and permeable cover or other like suitable body. By reason of this arrangement a very good thermal relation is established between the resistance heating element and the member or part of the patient's body that is being treated.

The resistance heating element is provided with a suitable source of electrical supply having a relatively low potential. A potential as low as from two to five volts will give quite satisfactory results, because, as previously pointed out, a very good heat conducting relation is established between the heating element and the part being treated by reason of the moisture absorbent and permeable covering for the heating element. Preferably, this low operating voltage will be obtained from a plurality of transformers connected in series between the compress and the usual electrical supply source that is found in residences, hospitals, and the like. This arrangement of transformers in series increases the safety of the device.

Preferably, the compress will be provided with suitable means for controlling the resistance heating element in accordance with the temperature of the pad.

For a more complete understanding of the invention, reference should be had to the accompanying drawing in which Fig. 1 is a diagrammatic representation of a heating compress embodying the invention and connected with a source of electrical supply and controlled in accordance with the invention; Fig. 2 is a diagrammatic representation of a modified form of the invention; and Fig. 3 is a perspective view of a heating pad embodying the invention, portions being broken away so as to illustrate certain structural details.

Referring more particularly to Fig. 3, the invention is shown as applied to an electrically heated compress comprising a moisture absorbent, permeable outer cover 10 formed of a suitable material, such as rough toweling, sponge rubber, or the like. And in this cover is arranged an inner cover 11 for the heating resistance element 12. The inner cover also will be formed of a suitable moisture absorbent material, but one which prevents the passage of moisture through it, and preferably will be formed of woven asbestos. Thus, both the outer cover 10 and the inner cover 11 will permit the passage of moisture. The side of the compress opposite to that which is directly applied to the part of the body to be treated may be covered with a heat insulating layer 13 formed of any suitable material, such as flannel or the like. This layer, as shown, may be attached directly to the covering 10.

The resistance heating element 12 may be and as shown is formed of a plurality of convolutions distributed over the area of the pad, and the convolutions may be secured in any suitable manner such as by means of suitable stitching 14. The resistance element may be formed of any suitable material, such as a nickel-chromium alloy. If desired, the resistance element may be given a grid form.

The compress is further provided with a suitable temperature control device shown as a thermostat 15 arranged in the heating circuit of the device (Figs. 1 and 2). This thermostat is shown as a bimetallic bar made of two strips of metal having different thermal coefficients of expansion, such as invar and Monel metal, these two strips being securely welded or brazed together lengthwise. The bimetallic bar is so arranged that when the compress attains a predetermined high temperature the thermostat will move to open the heating circuit of the compress, whereas when the compress attains a predetermined low temperature the bimetallic bar will move to re-energize the heating circuit of the compress.

The compress is provided with a suitable source of alternating current supply 16 which may be the usual supply source found in hospitals, residences, etc. As is well known, these supply sources usually have a comparatively high potential, such as 110 volts. In order to provide the relatively low potential of two to five volts (not more than ten volts), previously referred to, one or preferably two step-down transformers are connected in series and inserted in the connections between the supply source 16 and the heating element. As shown, two transformers 17 and 18 are provided for this purpose. Preferably, the transformer 17 will be used to step the potential of the supply source from say 110 volts down to 20 volts, and the transformer 18 will be arranged to step the 20 volt potential down to an operating potential of say 5 volts. As shown, the primary of the transformer 17 is connected with the electrical supply source 16, while its secondary is connected with the primary of the transformer 18. The secondary of the transformer 18 is connected directly with the heat generating element 12.

The thermostat 15 controls the heating element by means of a suitable relay 19 connected in the secondary circuit of the transformer 18, i. e., in the heating circuit of the pad. The operating coil of this relay, as shown, is connected across the secondary circuit of the transformer 18 through the thermostat 15 so that when the thermostat is closed an energizing circuit for the relay 19 will be completed to hold it closed and hence, to maintain the circuit of the compress closed, whereas when the bimetallic bar 15 is moved to its open position in response to a predetermined high temperature in the compress, the energizing circuit for the relay will be interrupted to disconnect the heating element from its supply source. It will be understood, of course, that when the heat compress is being used and its temperature lowers to a predetermined low value, the thermostat 15 will close to reconnect the heating element with its source of supply.

In the modified form of the invention shown in Fig. 2, the thermal controlled switch or relay is placed in the primary circuit of the step-down transformer rather than in the secondary circuit or heating circuit of the compress.

As shown, in Fig. 2, the heating resistance element 20 is electrically supplied from a suitable alternating current source 21 of relatively high potential through a suitable step-down transformer 22. This transformer reduces this relatively high potential to a relatively safe operating potential of say two to five volts. It will be understood, of course that in the arrangement shown in Fig. 2, two or more transformers connected in series may be interposed between the compress and its electrical supply source, as shown in Fig. 1.

As shown in Fig. 2, a thermostat 23 which operates responsively to the temperature of the compress controls the resistance element 20 by means of a relay 24 inserted in the primary connections of the transformer 22. As is the case with the system shown in Fig. 1, when the thermostat 23 is closed, the relay 24 will be energized to connect the heating element 20 with the electrical supply source, whereas when the thermostat moves to its open position it will deenergize the relay 24 so as to disconnect the heating element 20. Preferably, the relay 24 will be provided with suitable time element controlling means so as to delay the closing of the relay when the thermostat 23 has closed to complete its energizing circuit. For this purpose, a suitable dash-pot 25 is shown as connected directly with the armature of the relay.

In order to increase the safety of the compress, suitable voltage limiting devices which operate to open the heating circuit instantaneously in response to abnormal potentials may be provided. For this purpose, suitable fuses 26 are shown connected between the supply source 21 (Fig. 2) and the transformer 22. It will be understood, of course, that similar fuses may be provided between the primary of the transformer 17 and the supply source 16 in the system shown in Fig. 1.

While a particular embodiment of the invention has been shown, it will be understood, of course, that it is not limited thereto since many modifications may be made, and it is contemplated by the appended claims to cover any such modifications as fall within the true spirit and scope of the invention.

What we claim as new and desire to secure by Letters Patent of the United States is:

1. An electrically heated compress comprising a heating body, a heating element embedded in said body, a source of electrical supply for said heating element having a relatively high potential, a step-down transformer, electrical connections between the primary winding of said transformer and said source of supply and between the secondary of said transformer and said heating element and means responsive to the temperature of said heating body controlling the connections between said transformer and said heating element.

2. An electrically heated compress comprising a resistance heating element, a moisture absorbent and permeable covering for said heating element, a source of electrical supply for said heating element having a relatively high potential, a plurality of voltage step-down transformers connected between said source of supply and said heating element so as to step-down the potential of said source in a plurality of successive steps to a relatively low potential which is applied to said heating element and means responsive to the temperature of said covering controlling the connections between said transformers and said heating element.

3. An electrically heated compress comprising a moisture absorbent and permeable body, a heating element embedded in said body, a source of electrical supply for said heating element having a relatively high potential, a step-down transformer, electrical connections between the primary winding of said transformer and said source of supply and between the secondary of said transformer and said heating element and means responsive to the temperature of said body controlling the connections between the secondary of said transformer and said heating element.

4. An electrically heated compress comprising a moisture absorbent and permeable body, an electrical heating element embedded in said body, a source of electrical supply for said heating element having a relatively high potential, a transformer in the connections between said supply source and said resistance heating element arranged to reduce the potential applied to said heating element to a relatively low value and an over-voltage protective device in the primary circuit of said transformer.

5. An electrically heated compress comprising a moisture absorbent and permeable body, a heating element embedded in said body, a source of electrical supply for said heating element having a relatively high potential, a step-down transformer having its primary winding connected with said source of supply and a secondary winding connected with said heating element and means responsive to the temperature of said body controlling the connections between said source of supply and the primary winding of said transformer.

THEODOR SCHWEDENBERG.
RUDOLF AUERBACH.